United States Patent [19]

Kitamura

[11] Patent Number: 4,607,989

[45] Date of Patent: Aug. 26, 1986

[54] MACHINE TOOL

[75] Inventor: Koichiro Kitamura, Takaoka, Japan

[73] Assignee: Kitamura Machinery Co., Ltd., Takaoka, Japan

[21] Appl. No.: 745,942

[22] Filed: Jun. 18, 1985

[30] Foreign Application Priority Data

Jun. 19, 1984 [JP] Japan .............................. 59-90148[U]

[51] Int. Cl.$^4$ .......................... B23B 31/04; B23C 5/26
[52] U.S. Cl. .................. 409/232; 408/239 R; 409/234
[58] Field of Search ............... 409/231, 232, 233, 234; 279/1 S, 1 TS, 4; 408/238, 239 R, 239 A, 240

[56] References Cited

U.S. PATENT DOCUMENTS 3,678,632  7/1972  Eversole et al. ................ 409/231 X

FOREIGN PATENT DOCUMENTS 0052215  5/1978  Japan ................................... 409/232
0021706  2/1981  Japan ................................... 279/1 TS
0102547  6/1984  Japan ................................... 409/232

Primary Examiner—Z. R. Bilinsky
Attorney, Agent, or Firm—Wegner & Bretschneider

[57] ABSTRACT

A machine tool has a machine tool body (3), a spindle (1) having a supporting portion (2) and being rotatably supported by the machine tool body (3), and a tool holder (5) having an inserting portion (6) which is attached to the supporting portion (2). A ceramic layer (10, 11) is provided on the supporting portion (2) of the spindle (1) and/or the inserting portion (6) of the tool holder (5).

4 Claims, 4 Drawing Figures

MACHINE TOOL

BACKGROUND OF THE INVENTION

This invention relates to a machine tool and in particular relates to an improved tool holder or spindle in a machine tool.

In general, a spindle of a tool machine has a supporting portion for supporting a tool holder in a tapered opening or other opening. Such a supporting portion is used to be made of a hardened steel and ground for the finishing purpose. A tool holder is attached to the supporting portion of the spindle in such a way that an inserting portion of the tool holder is inserted into the supporting portion of the tool holder. The inserting portion of the tool holder is formed in a shape correspoding to that of the supporting portion of the spindle and made of a hardened steel. The supporting portion and the inserting portion are apt to rust if they are used for a long time and sometimes disfigured. In such a case, machining precision is reduced.

High speed revolution of a spindle causes a bearing to be heated. Such heat is transmitted to the spindle so as to deform the supporting portion. As a result, the fittness of the supporting portion of the spindle to the inserting portion of the tool holder becomes bad in such a way that the tool holder vibrates in machining.

SUMMARY OF THE INVENTION

An object of the invention is to provide a machine tool in which a spindle and/or a tool holder can be kept in a precise condition for a long time.

A further object of the invention is to provide a machine tool wherein heat from a bearing between a machine tool body and a spindle does not affect badly the supporting portion of the spindle and/or the inserting portion of the tool holder.

According to the invention, there is provided a machine tool comprising a spindle having a supporting portion, a tool holder having an inserting portion to be attached into the supporting portion of the spindle, and a ceramic layer provided on the supporting portion and/or the inserting portion. For instance, an inner surface of the supporting portion or the inserting portion is entirely or partly covered by the ceramic layer.

DETAILED DESCRIPTION OF THE PREFERRED EMBODIMENTS

Figure 1:
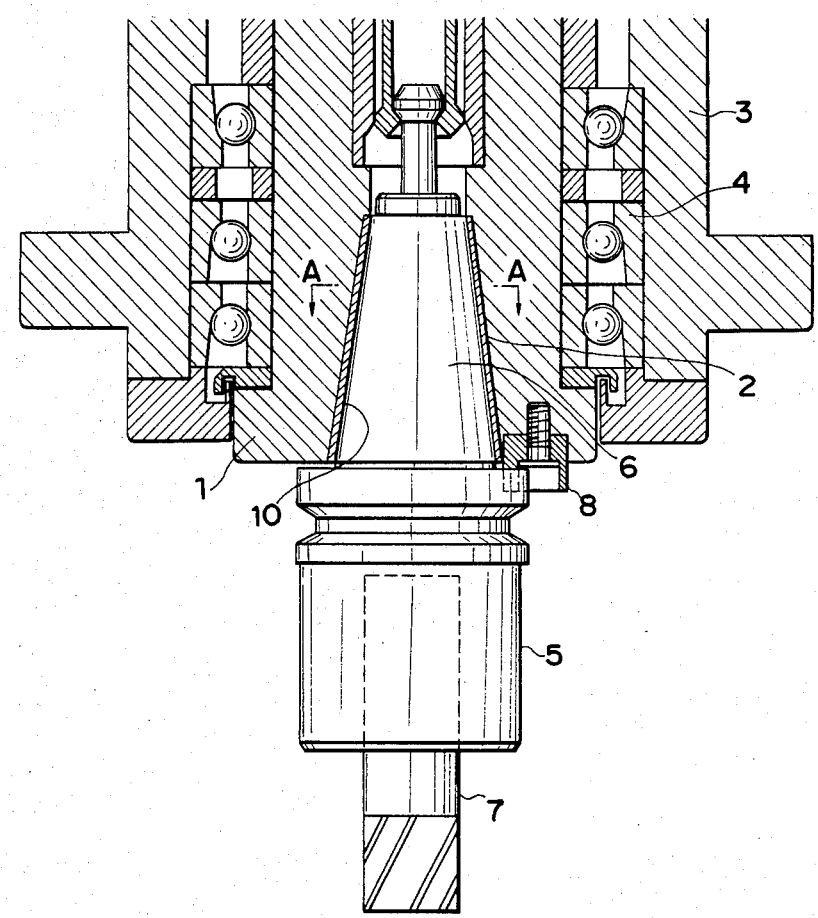
FIG. 1 shows a vertical section showing an essential portion of a machine tool according to an embodiment of the invention.
Figure 2:
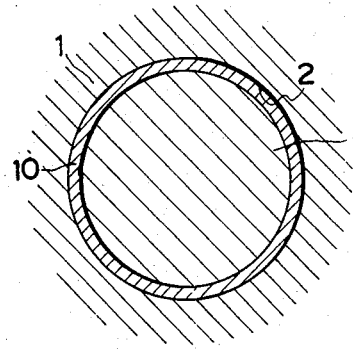
FIG. 2 is a sectional view taken along the line A—A of FIG. 1.

Referring now to FIGS. 1 and 2, in a machine tool, a spindle 1 has a supporting portion 2 into which an inserting portion 6 of a tool holder 5 is inserted and attached in a conventional manner. A machine tool body 3 supports the spindle 1 rotatably by way of plural ball bearings 4. A tool 7 is held by the tool holder 5. A stopper 8 is secured to a lower end portion of the spindle 1 so as to prevent the tool holder 5 from rotating relative to the spindle 1.

A ceramic layer 10 is provided on an inner surface of the supporting portion 2 of the spindle 1.

The ceramic layer 10 can be provided on the supporting portion 2 in any of the following ways:

(1) The supporting portion 2 of the spindle 1 is designed to have a tapered opening of a slightly larger size than the inserting portion 6 of the tool holder 5. A tapered core (not shown) is positioned in the supporting portion 2. The core has a slightly larger size than the inserting portion 6 of the tool holder 5. A molten ceramic material is poured into a narrow space between the core and the supporting portion 2 thereby to form the ceramic layer 10. If desired, the ceramic layer 10 is precisely ground for the finishing purpose.

(2) The supporting portion 2 of the spindle 1 is formed in a slightly larger size than the inserting portion 6 of the tool holder 5. The ceramic layer 10 is previously prepared and fixed onto the supporting portion 2 of the spindle 1 by means of an adhesive. If desired, the ceramic layer 10 can be precisely ground for the finishing purpose.

(3) The ceramic material is coated on the supporting portion 2 of the spindle 1 thereby to form the ceramic layer 10.

The ceramic layer 10 can be formed in any other manner.

Figure 3:
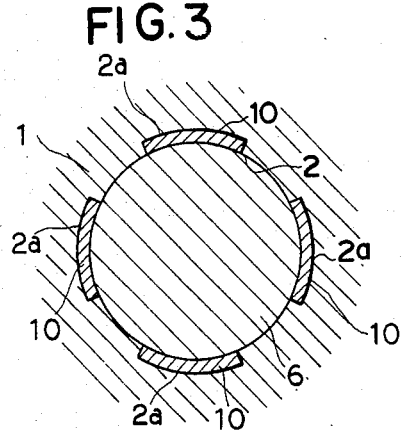
FIG. 3 shows a horizontal section showing an essential portion of a machine tool according to a further embodiment of the invention.

FIG. 3 shows another embodiment of the invention. A plurality of plate-like ceramic layers 10 are separately placed in a plurality of arc-shaped recesses 2a formed on the supporting portion 2 of the spindle 1. Except the ceramic layers 10, the embodiment of FIG. 3 is substantially the same as the embodiment of FIGS. 1 and 2.

Figure 4:
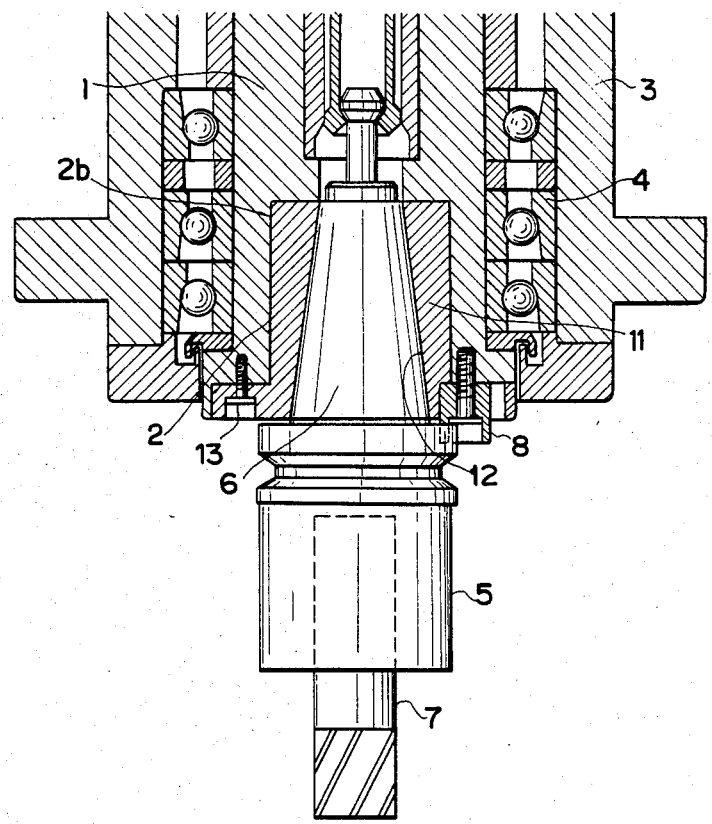
FIG. 4 shows a vertical section showing an essential portion of a machine tool according to another embodiment of the invention.

FIG. 4 shows a further embodiment of the invention. The cylindrical opening 2b is formed in a supporting portion of the spindle 1. A ceramic sleeve 11 has an outer configuration corresponding to the cylindrical opening 2b of the spindle 1. The ceramic sleeve 11 is fitted into the opening 2b of the spindle 1 and fixed to the spindle 1 by means of a screw 13. The ceramic sleeve 11 has a tapered supporting portion 12 onto which the inserting portion 6 of the tool holder 5 is attached. The stopper 8 is provided although it can be omitted.

Although in the above-stated embodiments of the invention the inserting portion 6 of the tool holder 5 and the supporting portion 2 of the spindle 1 are tapered, the invention is not limitted thereto. For instance, the inserting portion 6 of the tool holder 5 and the supporting portion 2 of the spindle 1 can be formed in any configuration. A collet can be used.

In addition, although in the above-stated embodiments the ceramic layer 10 is provided only at the spindle 1, a ceramic layer can be provided on the inserting portion 6 of the tool holder 5.

Any other embodiments and modifications of the invention are possible within the scope of the invention.

As can be seen from the foregoing description, according to the invention, the supporting portion of the spindle is provided with the ceramic layer which does not rust and is not disfigured for a long time. The ceramic layer is not affected by heat from the bearing between the machine tool body and the spindle so that machining precision of the machine tool can be remarkably improved. Therefore, lifetime of the spindle and/or the tool holder can be increased.

I claim:

1. A machine tool comprising:

a machine tool body;

a spindle rotatably supported by the machine tool body, the spindle having at its lower end portion an opening-like supporting portion;

a ceramic sleeve detachably attached to the supporting portion of the spindle, a tool holder having an inserting portion which is adapted to be attached into the ceramic sleeve;

a ceramic flange portion formed in one piece at a lower end of the ceramic sleeve, in such a manner that the ceramic flange portion extends radially from the ceramic sleeve along the lower portion of the spindle; and means for fixing the ceramic flange portion of the ceramic sleeve onto the lower end portion of the spindle.

2. The machine tool of claim 1, wherein the fixing means includes a male screw fixed to the spindle.

3. The machine tool of claim 2, wherein the fixing means includes a stopper fixed to said spindle, said stopper preventing the spindle from rotating about its central axis.

4. The machine tool of claim 2, wherein the ceramic flange portion of the ceramic sleeve has a hole through which the male screw passes and engages in a female screw formed in the lower end portion of the spindle.

* * * * *